June 8, 1948. H. R. McCLELLAN ET AL 2,443,009
EXTENSION SPOTLAMP
Filed March 13, 1945 2 Sheets-Sheet 1
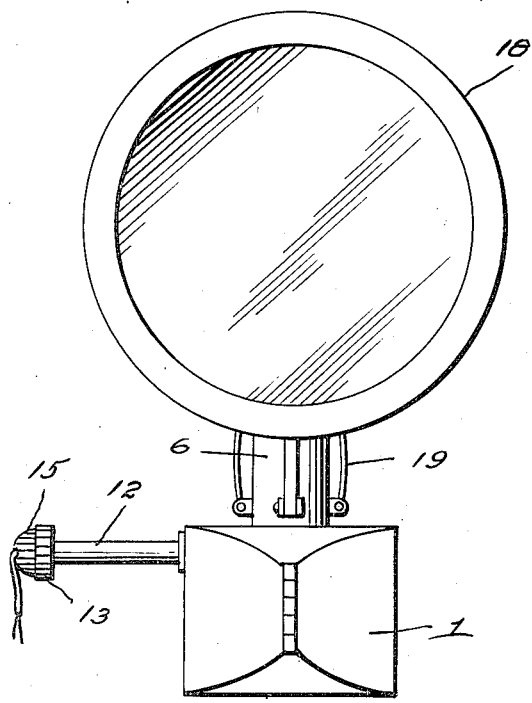
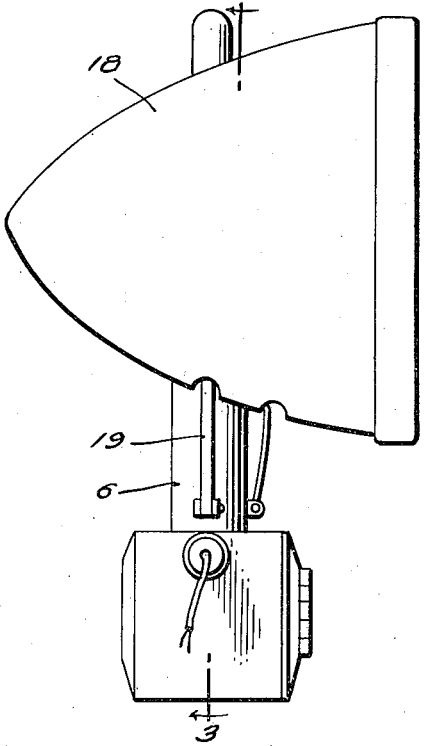
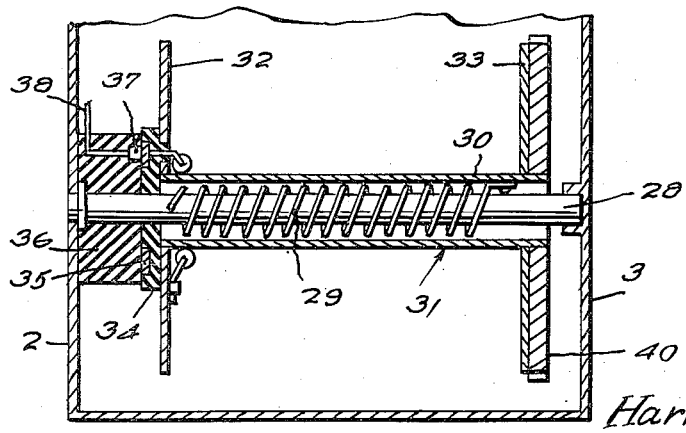
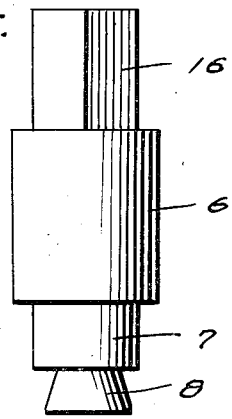
Inventors
Harry R. McClellan,
George T. McClellan June 8, 1948.  H. R. McCLELLAN ET AL  2,443,009
EXTENSION SPOTLAMP
Filed March 13, 1945  2 Sheets-Sheet 2
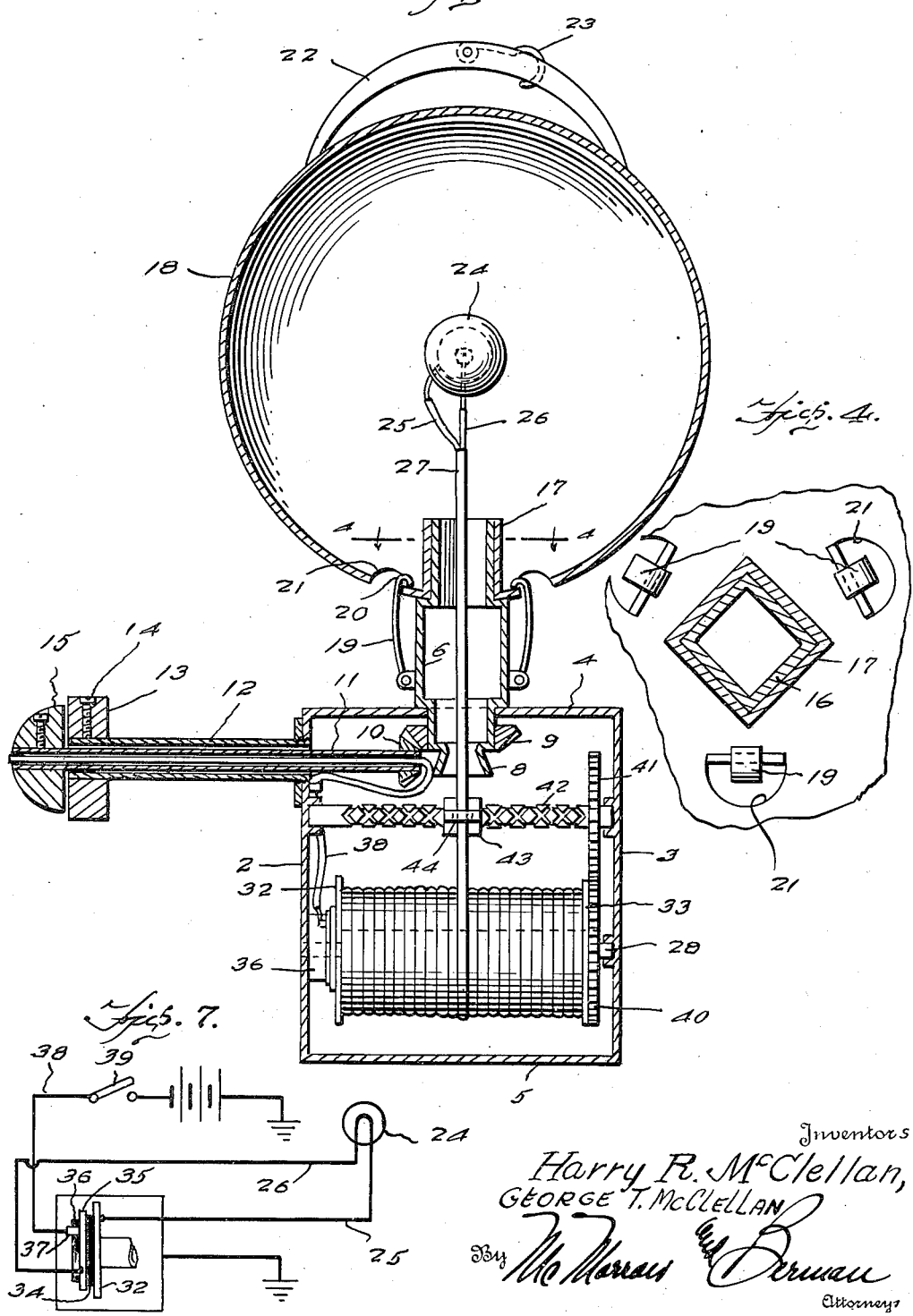

Patented June 8, 1948

2,443,009

UNITED STATES PATENT OFFICE 2,443,009

EXTENSION SPOTLAMP

Harry R. McClellan and George T. McClellan, Detroit, Mich.

Application March 13, 1945, Serial No. 582,534

2 Claims. (Cl. 240—8.18)

This invention relates to spot lamps for vehicles or the like, and more particularly, to an adjustable spot lamp adapted to be disengaged from its normal position on the vehicle and to be moved to other desired positions.

A main object of the invention is to provide a novel and improved adjustable spot lamp structure for a vehicle.

A further object of the invention is to provide an improved spot lamp which is of simple construction and which may be readily disengaged from its normal mounting for employment as a trouble lamp or for furnishing desired illumination at other than its normal position on a vehicle.

Further objects and advantages of the invention will appear from the following description and claims, and from the accompanying drawings, wherein:

Figure 1 is a front elevational view of an improved spot lamp in accordance with the invention.

Figure 2 is a side elevational view of the spot lamp of Figure 1.

Figure 3 is a vertical cross-sectional view taken on line 3—3 of Figure 2 but somewhat enlarged in scale.

Figure 4 is a cross-sectional view taken on line 4—4 of Figure 3.

Figure 5 is a detail view in cross-section showing the winding reel structure of the spot lamp of Figure 1.

Figure 6 is a detail view of the lamp supporting member employed in the structure of Figure 1.

Figure 7 is a schematic wiring diagram of the electric circuit for the spot lamp of Figure 1.

Referring to the drawings, 1 designates a housing of sheet metal or other suitable metal adapted to be rigidly secured to a portion of the vehicle in a position at which the spot lamp is to be located for normal operation. Housing 1 is generally box-shaped and is provided with side walls 2 and 3, a top wall 4 and a bottom wall 5, as well as front and rear walls which are tapered to provide a streamlined appearance.

Rotatably mounted in top wall 4 is a short, generally tubular support member 6 provided with a lower cylindrical section 7 of reduced diameter which rotatively fits a circular opening in top wall 4, tubular member 6 bearing on said top wall at the shoulder formed between section 7 and the main body portion of said tubular member. The bottom end of tubular member 6 is formed with a reduced downwardly flaring portion 8.

Rigidly secured to section 7 is a bevel gear 9 which meshes with a bevel gear 10 carried on a hollow horizontal shaft 11 journaled in a laterally projecting sleeve 12 appropriately rigidly secured to side wall 2. Sleeve 12 carries a calibrated stationary annular member 13 rigidly secured to said sleeve at the free end thereof as by a set screw 14. A rounded annular knob member 15 is rigidly secured to the outwardly projecting end of hollow shaft 11 adjacent member 13. An indicating pointer may be marked on knob 15 which will show the position of adjustment of shaft 11 with respect to the calibration markings (not shown) on member 13 for indicating the rotated position of support member 6.

The upper end of support member 6 is reduced and squared as shown at 16, to fit into a square sleeve 17 provided at the bottom of a spot lamp shell 18 whereby said shell may be supported on member 6. A plurality of spring clips 19 are pivotally secured to member 6 and are formed with hooked free ends 20 for insertion into appropriately flanged openings 21 in the bottom of shell 18 for resiliently and detachably clamping said shell in position on member 6. Spring clips 19 may be readily disengaged from openings 21 to permit easy removal of shell 18 from its seat on member 6.

The top of shell 18 is provided with a handle 22 provided with an auxiliary hook 23 pivotally secured to said handle and normally seated in an appropriate recess formed therein so as to be substantially flush with the surface of the handle. Hook 23 may be readily pulled out of its recess when it is desired to hang the spot lamp from a suitable support by said hook.

Shell 18 contains an appropriately mounted lamp 24 received in a conventional socket connected to the respective conductors 25 and 26 which are sheathed in a jacket 27.

Rigidly mounted in the lower portion of housing 1 between side walls 2 and 3 is a shaft 28. Encircling shaft 28 is a coiled spring 29, one end of which is secured to shaft 28 and the other end of which is secured to the sleeve portion 30 of a hollow metal reel 31 which is supported by said spring 29 in concentric relation to shaft 28. Reel 31 is provided with a first circular flange 32 and a second circular flange 33. Circular flange 32 carries rigidly secured thereto an annular insulating block 34 provided with an external annular metal contact ring 35 embedded therein. A stationary insulating block 36 is secured to side wall 2 provided with a metal contact brush member 37 arranged to make continuous contact with ring 35 duration rotation of reel 31. Brush member 37 is connected to an insulated conductor 38 which in turn extends through shaft 11 to an appropriate switch 39 and thence to the "hot" terminal of the vehicle battery. Insulated conductor 38 is secured to the inner wall surface of housing 1 by appropriate securing clips.

Flange 33 of reel 31 carries rigidly secured thereto a gear 40 which meshes with a gear 41 rigidly mounted on a shaft 42 journaled between side walls 2 and 3 in parallel relation to reel 31 and located substantially under flaring member 8. Mounted on shaft 42 is a guide sleeve member 43. Shaft 42 is formed with a pair of reversely running continuously connected helical grooves which cooperate with an appropriate lug member formed on the interior bore of guide sleeve 43 to regulate the rate of travel of guide sleeve 43 to the right or left on shaft 42.

Conductor wires 25 and 26 encased in jacket 27 pass through an eye lug 44 formed on guide sleeve 43 and are wound on reel 31 under the tension of coiled spring 29. The arrangement of the turns is regulated by guide sleeve 43 so that when the end of a row is reached, guide sleeve 43 will be automatically reversed in its direction of movement on shaft 42 to guide the wires to form a new row.

Wire 26 is connected at its reel engaging end to ring 35 and wire 25 is grounded to circular flange 32, which is itself grounded to the frame of the vehicle by shaft 28 and housing 1. A circuit is therefore provided for energizing lamp 24 when switch 39 is closed which comprises conductor 38, brush 37, ring 35 and conductor 26 on the "hot" side, and conductor 25 which is grounded through reel 31 on the "cold" side.

When it is desired to move the spotlamp to a desired location, spring clips 19 are disengaged from shell 18 and the shell is lifted off its seat by handle 22. The connecting wires for the lamp will unwind from reel 31 as the lamp is moved away from its original position. Said wires will automatically rewind in compact arrangement on reel 31 as the lamp is returned to its normal location and is reseated on member 6.

In normal position, the direction of the lamp beam may be accurately regulated by knob 15 in conjunction with calibrated member 13.

While a specific embodiment of a demountable spot lamp for a vehicle has been disclosed in the foregoing description, it will be understood that various modifications within the spirit of the invention may occur to those skilled in the art. Therefore it is intended that no limitation be placed on the invention other than as defined by the scope of the appended claims.

What is claimed is:

1. In a demountable spot lamp for a motor vehicle, including a housing carried by said vehicle, an electric extension cord extensibly carried within said housing, and an electric lamp operatively connected to said cord outwardly of said housing; the improvement comprising a lamp shell enclosing said electric lamp, said shell being formed with a non-circular opening through a lower portion thereof, an upwardly-extending non-circular tubular sleeve fixed to said shell concentrically-disposed about said opening inwardly of said shell, said shell being formed with at least one additional aperture through a lower portion thereof in laterally-spaced relation to said opening, said shell including an upwardly-directed lug inwardly thereof and adjacent said aperture, a tubular bearing journaled in said housing, said cord extending through said bearing, said bearing including a non-circular and reduced upper end complementary to said sleeve and slidably received therein, at least one spring clip, means mounting said clip on said bearing outwardly of said housing, said clip including a hook, and said hook being insertable through said aperture in said shell and engageable with said lug to detachably secure said shell on said bearing.

2. In a demountable spot lamp for a motor vehicle, including a housing carried by said vehicle, an electric extension cord extensibly carried within said housing, and an electric lamp operatively connected to said cord outwardly of said housing; the improvement comprising a lamp shell enclosing said electric lamp, said shell being formed with a non-circular opening through a lower portion thereof, an upwardly-extending non-circular tubular sleeve fixed to said shell concentrically disposed about said opening inwardly of said shell, a tubular bearing journaled in said housing, said cord extending through said bearing, said bearing including a non-circular and reduced upper end complementary to said sleeve and slidably received therein, a plurality of spring clips, means pivotally connecting said clips to said bearing outwardly of said housing, said shell being formed with a plurality of apertures through a lower portion thereof, said apertures in surrounding and laterally-spaced relation to said non-circular opening and in vertical alignment with said clips, upwardly-directed flanges formed in said shell, there being a flange adjacent each aperture, and each of said clips including a hook insertable through one of said apertures and detachably engageable with said adjacent flange to detachably connect said shell to said bearing.

HARRY R. McCLELLAN.
GEORGE T. McCLELLAN.

REFERENCES CITED

The following references are of record in the file of this patent:

UNITED STATES PATENTS

| Number | Name | Date |
| --- | --- | --- |
| 1,498,534 | Anderson et al. | June 24, 1924 |
| 2,133,551 | Logan | Oct. 18, 1938 |

FOREIGN PATENTS

| Number | Country | Date |
| --- | --- | --- |
| 4,131 | France | Mar. 21, 1905 |
| | (1st addition to No. 337,941) | |